United States Patent
Hill et al.

(10) Patent No.: US 6,381,467 B1
(45) Date of Patent: Apr. 30, 2002

(54) METHOD AND APPARATUS FOR MANAGING AN AD HOC WIRELESS NETWORK

(75) Inventors: Thomas Casey Hill, Crystal Lake, IL (US); Slim Souissi, San Diego, CA (US); Steve Jeffrey Goldberg, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 116 days.

(21) Appl. No.: 09/602,185

(22) Filed: Jun. 22, 2000

(51) Int. Cl.[7] .............................. H04B 7/00; H04Q 7/20
(52) U.S. Cl. ..................... 455/519; 455/453; 455/41; 370/252; 370/328; 370/465
(58) Field of Search ............................ 455/519, 450, 455/453, 502, 41, 66, 524, 11.1; 370/310, 338, 254, 410, 328; 252, 465

(56) References Cited

U.S. PATENT DOCUMENTS

| | | | | |
|---|---|---|---|---|
| 5,448,758 A | * | 9/1995 | Grube et al. ................ | 455/503 |
| 5,682,379 A | * | 10/1997 | Mahany et al. ........ | 340/825.73 |
| 5,852,405 A | * | 12/1998 | Yoneda et al. ......... | 340/825.02 |
| 6,184,778 B1 | * | 2/2001 | Tsuji ..................... | 340/286.02 |
| 6,278,723 B1 | * | 8/2001 | Meihofer et al. ........... | 375/131 |

OTHER PUBLICATIONS

Bluetooth Specification Version 1.0B, Nov. 29, 1999, pp. 122–125.*

* cited by examiner

Primary Examiner—Dwayne Bost
Assistant Examiner—Lewis West
(74) Attorney, Agent, or Firm—R. Louis Breeden

(57) ABSTRACT

In an ad hoc wireless network having a plurality of members (100) a master, while communicating on a first communication channel, recognizes (202) a need for assistance in managing the network. In response to the need, the master negotiates (204) with a member of the ad hoc wireless network for the member to become a sub-master. The sub-master then assumes (206) management of a portion of the plurality of members. The sub-master and the portion then communicate (208) on a second communication channel negotiated with the master.

24 Claims, 1 Drawing Sheet

METHOD AND APPARATUS FOR MANAGING AN AD HOC WIRELESS NETWORK

FIELD OF THE INVENTION

This invention relates in general to wireless communication systems, and more specifically to a method and apparatus for managing an ad hoc wireless network.

BACKGROUND OF THE INVENTION

Short-range wireless communication systems such as Bluetooth are becoming popular. The communication devices of these systems typically form an ad hoc wireless network when within communication range of one another. One communication device assumes the role of master and temporarily manages and synchronizes the other communication devices in the ad hoc wireless network through well-known techniques. There is a limit, however, to the number of communication devices that a master can manage. In Bluetooth, for example, a master can manage up to seven other communication devices. Additional factors such as interference and battery life can limit the ability of a master to manage other devices.

What is needed is a way for a master to off-load some or all managed communication devices when capacity or other factors make it necessary for the master to lighten its management load.

DETAILED DESCRIPTION OF THE DRAWINGS

Figure 1:
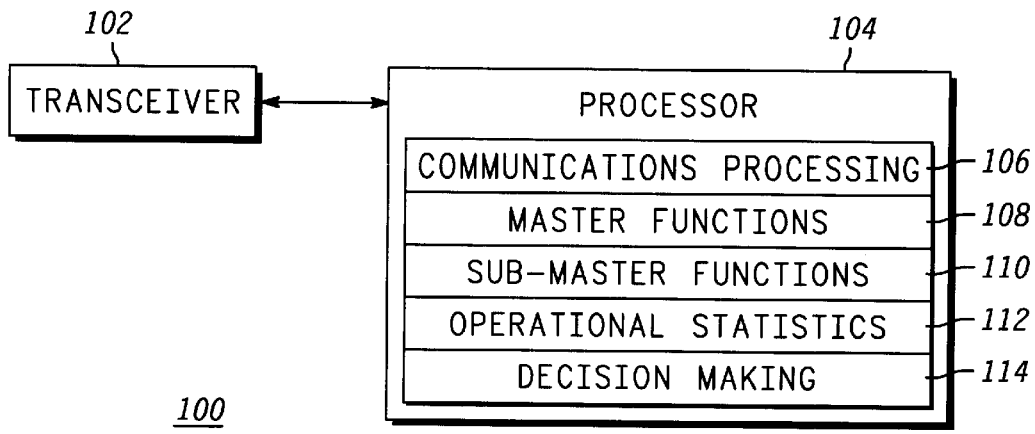
FIG. 1 is an electrical block diagram of a communication device in accordance with the present invention.

Referring to FIG. 1, an electrical block diagram depicts a communication device 100 in accordance with the present invention. The communication device 100 comprises a conventional transceiver 102 for communicating with another similar communication device as members of an ad hoc wireless network. The communication device 100 further comprises a processor 104 coupled to the transceiver 102 for controlling the transceiver 102. The processor 104 includes a communications processing program 106 for programming the processor 104 to process communications in accordance with an ad hoc wireless network protocol through well-known techniques. The processor 104 further includes a master functions program 108 for programming the processor 104 to perform as a master of the ad hoc wireless network. The processor 104 also includes a sub-master functions program 110 for programming the processor 104 to perform as a sub-master of the ad hoc wireless network. In addition, the processor 104 includes an operational statistics program 112 for programming the processor 104 to collect and report operational statistics to the master when the communication device 100 is acting as a sub-master. The processor 104 further comprises a decision making program 114 for programming the processor 104 to make decisions affecting the operation of the sub-master when the communication device 100 is acting as a master. Operation of the communication device 100 is described further below.

Figure 2:
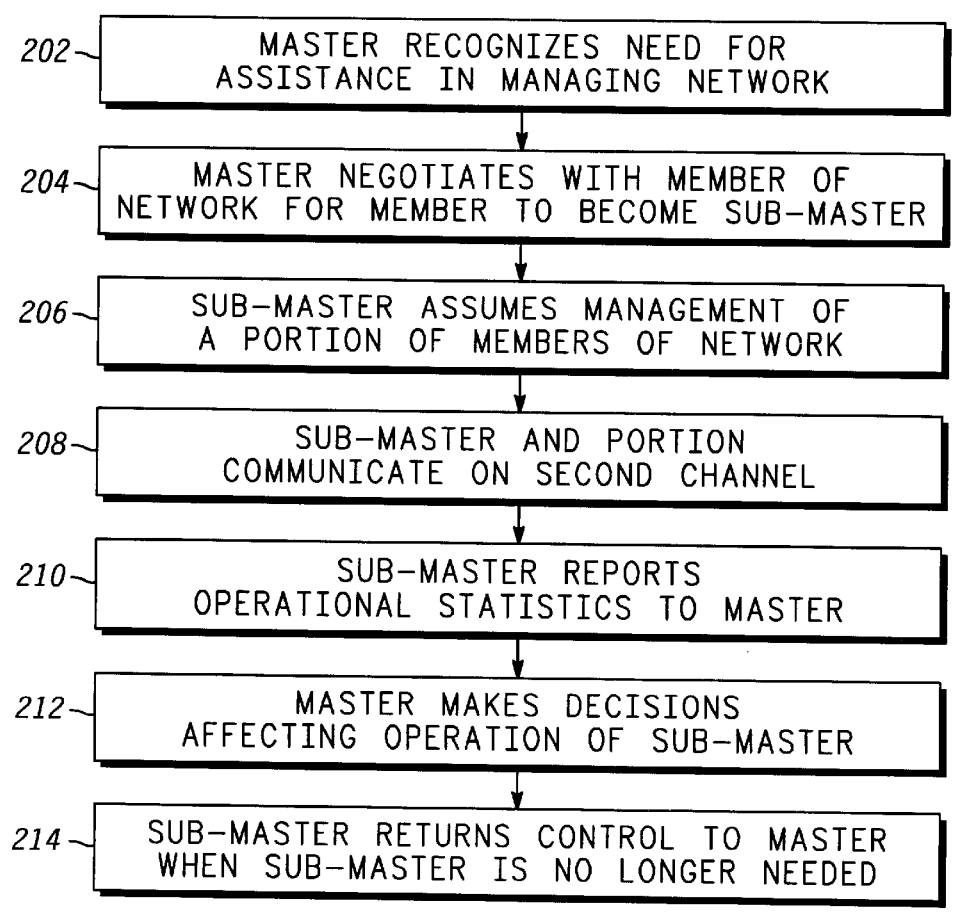
FIG. 2 is a flow diagram depicting operation of the communication device in accordance with the present invention.

Referring to FIG. 2, a flow diagram 200 depicts operation of the communication device 100 in accordance with the present invention. The flow begins when the processor 104 of the communication device 100 acting through well-known techniques as the master recognizes 202 a need for assistance in managing the ad hoc wireless network. In one embodiment, the processor 104 is programmed to recognize the need for assistance in response to experiencing a traffic level exceeding a predetermined threshold. In another embodiment, the processor 104 is programmed to recognize the need for assistance in response to experiencing in the ad hoc wireless network an interference level exceeding a predetermined threshold. The interference level can be that experienced by the master or that experienced and reported by a communication device 100 managed by the master. In yet another embodiment, the processor 104 is programmed to recognize the need for assistance in response to detecting a need to establish communications between a first communication device 100 in the ad hoc wireless network and a second communication device 100 within range of the first communication device but not within range of the master. In this case, the master can negotiate with the first communication device 100 for the first communication device 100 to become a sub-master and then to establish its own ad hoc wireless network with the second communication device 100 on a communication channel different from the communication channel used by the master.

In a fourth embodiment, the processor 104 is programmed to recognize the need for assistance in response to detecting that it is time for a predetermined scheduled event to occur. For example, a master may cover several airport gates. At certain times, e.g., during flight check-in, a sub-master is required to handle the capacity of one of the gates, while the master continues directing traffic for the whole area. Alternatively, the processor can be programmed to recognize the need for assistance in response to detecting that a predetermined event has occurred. Continuing the preceding example, the master can establish the sub-master in response to detecting that the airplane is at the gate.

In a fifth embodiment, the processor 104 is programmed to recognize the need for assistance in response to detecting a packet error rate that exceeds a predetermined threshold. In a sixth embodiment, the ad hoc network operates on a first physical layer, e.g., 1 Mbps, and the processor 104 is programmed to recognize the need for assistance in response to desiring to establish a second ad hoc network operating on a second physical layer different from the first physical layer, e.g., 10 Mbps. In a seventh embodiment, the processor 104 is programmed to recognize the need for assistance in response to detecting that messages of multiple predetermined types need to be sent. For example, email messages and video can be handled by separate sub-masters to optimize delivery.

In an eighth embodiment, the processor 104 is programmed to recognize the need for assistance in response to determining that a potential sub-master has substantially greater power resources than those of the master. For example, when the master is battery-powered, and the potential sub-master is mains-powered, then the potential sub-master can take over the management of the ad hoc network to conserve the battery power of the master.

Referring again to FIG. 2, in response to recognizing the need for assistance, the master negotiates 204 with a member of the ad hoc wireless network for the member to become a sub-master. The sub-master then assumes 206 management of a portion of the members of the network, communicating 208 with the portion on a communication channel negotiated with the master. The communication channel can be the same channel used by the master, or a different channel, depending on the traffic and the reason for the need for assistance. In Bluetooth, for example, a communication channel is represented by a predetermined frequency hopping sequence. In a system using code division multiple access (CDMA), the master and sub-master could use the same or different pseudorandom noise (PN) code sequences.

The sub-master reports 210 predetermined operational statistics (such as traffic load), to the master; and the master makes decisions 212 affecting operation of the sub-master, based at least in part on the operational statistics reported. The sub-master returns 214 control to the master when the sub-master is no longer needed. The sub-master, for example, can return control to the master when the traffic load handled by the sub-master falls below a predetermined traffic load.

It should be clear from the preceding disclosure that the present invention provides a method and apparatus in an ad hoc wireless network for a master to off-load some or all managed communication devices when capacity or other factors make it necessary for the master to lighten its management load. The method and apparatus advantageously allows the ad hoc wireless network to maintain a proper balance between managing and managed communication devices.

Many modifications and variations of the present invention are possible in light of the above teachings. Thus, it is to be understood that, within the scope of the appended claims, the invention can be practiced other than as specifically described herein above.

What is claimed is:

1. A method for managing an ad hoc wireless network having a plurality of members, comprising the steps of:
   recognizing, by a master while communicating on a first communication channel, a need for assistance in managing the network;
   negotiating, by the master, with a member of the ad hoc wireless network for the member to become a sub-master, in response to the recognizing step;
   assuming, by the sub-master, management of a portion of the plurality of members to the sub-master, after the negotiating step; and
   then communicating, by the sub-master and said portion, on a second communication channel negotiated with the master.

2. The method of claim 1, wherein the recognizing step comprises the step of experiencing a traffic level exceeding a predetermined threshold.

3. The method of claim 1, wherein the recognizing step comprises the step of experiencing in the ad hoc wireless network an interference level exceeding a predetermined threshold.

4. The method of claim 1, wherein the recognizing step comprises the step of detecting a need to establish communications between a first communication device in the ad hoc wireless network and a second communication device within range of the first communication device but not within range of the master.

5. The method of claim 1, wherein the recognizing step comprises the step of detecting that it is time for a predetermined scheduled event to occur.

6. The method of claim 1, wherein the recognizing step comprises the step of detecting that a predetermined event has occurred.

7. The method of claim 1, wherein the recognizing step comprises the step of detecting a packet error rate that exceeds a predetermined threshold.

8. The method of claim 1,
   wherein the ad hoc wireless network operates on a first physical layer, and
   wherein the recognizing step comprises the step of desiring to establish a second ad hoc network operating on a second physical layer different from the first physical layer.

9. The method of claim 1, wherein the recognizing step comprises the step of detecting that messages of multiple predetermined types need to be sent.

10. The method of claim 1, further comprising the steps of:
    reporting, to the master by the sub-master, predetermined operational statistics, and
    making, by the master, decisions affecting operation of the sub-master.

11. The method of claim 1, wherein the communicating step comprises the steps of:
    returning control to the master when the sub-master is no longer needed.

12. The method of claim 1, wherein the recognizing step comprises the step of determining that a potential sub-master has substantially greater power resources than those of the master.

13. A communication device for managing an ad hoc wireless network having a plurality of members, comprising:
    a transceiver for communicating with another communication device; and
    a processor coupled to the transceiver for controlling the transceiver, wherein, when the communication device is acting as a master, the processor is programmed to:
      recognize, while communicating on a first communication channel, a need for assistance in managing the network; and
      negotiate with a member of the ad hoc wireless network for the member to become a sub-master, in response to the need, and wherein, when the communication device is acting as the sub-master, the processor is programmed to:
      assume management of a portion of the plurality of members; and
      then control the transceiver to communicate with said portion, on a second communication channel negotiated with the master.

14. The communication device of claim 13, wherein the processor is further programmed to recognize the need for assistance in response to experiencing a traffic level exceeding a predetermined threshold.

15. The communication device of claim 13, wherein the processor is further programmed to recognize the need for assistance in response to experiencing in the ad hoc wireless network an interference level exceeding a predetermined threshold.

16. The communication device of claim 13, wherein the processor is further programmed to recognize the need for assistance in response to detecting a need to establish communications between a first communication device in the ad hoc wireless network and a second communication device within range of the first communication device but not within range of the master.

17. The communication device of claim 13, wherein the processor is further programmed to recognize the need for assistance in response to detecting that it is time for a predetermined scheduled event to occur.

18. The communication device of claim 13, wherein the processor is further programmed to recognize the need for assistance in response to detecting that a predetermined event has occurred.

19. The communication device of claim 13, wherein the processor is further programmed to recognize the need for assistance in response to detecting a packet error rate that exceeds a predetermined threshold.

20. The communication device of claim 13, wherein the ad hoc wireless network operates on a first physical layer, and wherein the processor is further programmed to recognize the need for assistance in response to desiring to establish a second ad hoc network operating on a second physical layer different from the first physical layer.

21. The communication device of claim 13, wherein the processor is further programmed to recognize the need for assistance in response to detecting that messages of multiple predetermined types need to be sent.

22. The communication device of claim 13, wherein the processor, when the communication device is acting as the sub-master, is further programmed to report predetermined operational statistics, to the master, and wherein the processor, when the communication device is acting as the master, is further programmed to make decisions affecting operation of the sub-master.

23. The communication device of claim 13, wherein the processor, when the communication device is acting as the sub-master, is further programmed to return control to the master when the sub-master is no longer needed.

24. The communication device of claim 13, wherein, when the communication device is acting as the master, the processor is further programmed to recognize the need for assistance in response to determining that a potential sub-master has substantially greater power resources than those of the master.

\* \* \* \* \*